US010372726B2

(12) United States Patent
Brodt et al.

(10) Patent No.: US 10,372,726 B2
(45) Date of Patent: Aug. 6, 2019

(54) CONSISTENT QUERY EXECUTION IN HYBRID DBMS

(71) Applicant: International Business Machines Corporation, Armonk, NY (US)

(72) Inventors: Andreas Brodt, Gerlingen (DE); Oliver Koeth, Stuttgart (DE); Daniel Martin, Stuttgart (DE); Knut Stolze, Hummelshain (DE)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 15/232,304

(22) Filed: Aug. 9, 2016

(65) Prior Publication Data
US 2018/0046693 A1 Feb. 15, 2018

(51) Int. Cl.
| | | |
|---|---|---|
| *G06F 17/30* | (2006.01) | |
| *G06F 16/27* | (2019.01) | |
| *G06F 16/22* | (2019.01) | |
| *G06F 16/2455* | (2019.01) | |

(52) U.S. Cl.
CPC ........ *G06F 16/273* (2019.01); *G06F 16/2282* (2019.01); *G06F 16/2455* (2019.01)

(58) Field of Classification Search
CPC ........ G06F 17/30578; G06F 17/30339; G06F 17/30477; G06F 16/273; G06F 16/2282; G06F 16/2455
See application file for complete search history.

(56) References Cited

U.S. PATENT DOCUMENTS

| | | | |
|---|---|---|---|
| 8,364,636 B2 | 1/2013 | Newport et al. | |
| 8,392,387 B2 | 3/2013 | Bourbonnais et al. | |
| 8,775,381 B1 | 7/2014 | McCline et al. | |
| 9,251,021 B2 | 2/2016 | Calder et al. | |
| 2010/0191884 A1* | 7/2010 | Holenstein .......... | G06F 11/2094 710/200 |
| 2011/0066592 A1* | 3/2011 | Newport ........... | G06F 17/30578 707/615 |

(Continued)

OTHER PUBLICATIONS

Assaf Natanzon et al., "Dynamic Synchronous/Asynchronous Replication", Aug. 2013, ACM, pp. 1-19 (Year: 2013).*

(Continued)

*Primary Examiner* — Jared M Bibbee
(74) *Attorney, Agent, or Firm* — Isaac J. Gooshaw (57) ABSTRACT

A method includes, where a first database engine maintains a first database, a second database engine maintains a second database, and a table has a first instance in the first database and a second instance in the second database, executing write transactions, asynchronously pooling the changes of the first instance, and, in response to receiving a query against the table, determining to execute the query against the second instance. The method further includes identifying a first time, defining a current replication batch that selectively comprises the pooled changes of the transactions before the first time, asynchronously replicating the current replication batch, storing each change, assigning a batch-ID to the query, sending the query and the batch-ID to the second engine, responsive to the current replication batch being completed, executing the query on the second instance, and returning results of the query execution on the second instance.

18 Claims, 6 Drawing Sheets

(56) References Cited

U.S. PATENT DOCUMENTS

| | | | |
|---|---|---|---|
| 2013/0151467 A1 | 6/2013 | Krishnan et al. | |
| 2013/0332415 A1* | 12/2013 | Frerking | G06F 17/30578 707/613 |
| 2014/0101102 A1* | 4/2014 | Baumgarten | G06F 17/30174 707/634 |
| 2016/0110439 A1* | 4/2016 | Hrle | G06F 17/30578 707/600 |

OTHER PUBLICATIONS

Thomson et al., "Calvin: Fast Distributed Transactions for Partitioned Database Systems", SIGMOD '12, May 20-24, 2012, Scottsdale, Arizona, USA, Copyright 2012 ACM 978-1-4503-1247-9112105, 12 pages.

Van Donselaar, Vincent, "Low latency asynchronous database synchronization and data transformation using the replication log.", University of Twente, Master Thesis, Aug. 14, 2015, 59 pages, <http://essay.utwente.nl/67819/1/vanDonselaar_MA_EEMCS.pdf>.

"Two-phase commit protocol", Wikipedia, the free encyclopedia, this page was last modified on Jul. 3, 2016, printed on Jul. 15, 2016, 5 pages, <https://en.wikipedia.org/wiki/Two-phase_commit_protocol>.

"Using temporal tables in DB2 10 for z/OS and DB2 11 for z/Os", IBM developerWorks, Oct. 16, 2014, 13 pages, printed on Jul. 15, 2016, <http://www.ibm.com/developerworks/data/library/techarticle/dm-1410temporal-tables-db2zos/index.html>.

IBM Appendix P, "List of IBM Patents or Patent Applications to be Treated as Related", Dated Nov. 15, 2017, 2 pages.

Brodt et al., "Consultant Query Execution in Hybrid DBMS", U.S. Appl. No. 15/232,304, filed Nov. 15, 2017, pp. 1-36.

\* cited by examiner

CONSISTENT QUERY EXECUTION IN HYBRID DBMS

BACKGROUND

The present invention relates to executing database queries in a hybrid Database Managements System ("DBMS"), and more particularly to consistent query execution in the DBMS.

A hybrid DBMS includes at least two database engines and at least two databases. Typically, at least a portion of the data of a first database is replicated to the second database, but where such data is organized and stored in a manner different than in the first database.

Typically, the two database engines and the way the data is stored and organized in the two databases are optimized for different types of queries. Usually, hybrid DBMSs categorize at least some of the incoming queries and execute each query on the engine that is predicted to be most suited for executing the query. A key challenge for such hybrid DBMSs is to ensure, with low computational overhead, data consistency and consistent computation of the same result irrespective of the engine used for performing the query.

SUMMARY

A computer-implemented method includes, in data processing system including a first database engine maintaining a first database, a second database engine maintaining a second database, a table existing as a first instance in the first database and as a second instance in the second database, and a replication module, executing, by the first engine, a plurality of write transactions, thereby respectively changing the first instance; asynchronously pooling, by the replication module, the changes of the first instance introduced by the write transactions, and in response to receiving a query against the table, determining whether to execute the query against the first instance or against the second instance. The method further includes, responsive to determining to execute the query against the second instance: identifying, by the first engine, a first time, the first time being the commit time of the most recent of the write transactions before the receipt of the query, defining, by the first engine, a current replication batch that selectively comprises the pooled changes of the ones of the transactions having committed at or before the first time, asynchronously replicating, by the replication module, the current replication batch, thereby propagating the changes of the first instance specified in the current replication batch to the second instance, storing, by the second engine, each change that is specified in the current replication batch in the second instance, assigning, by the first engine, a batch-ID of the current replication batch to the query, sending, by the first engine, the query and the assigned batch-ID to the second engine, determining, by the second engine, if the replication of the current replication batch was completed, responsive to the current replication batch having been completed, executing, by the second engine, the query on the second instance, thereby using the batch-ID assigned to the query as a filter to exclude any changes having assigned a batch-ID of a replication batch having committed later than the current replication batch, and returning, by the second engine, results of the query execution on the second instance. A corresponding computer program product and computer system are also disclosed.

DETAILED DESCRIPTION

In one aspect, the invention relates to a computer-implemented method for processing a query directed against a table in a data processing system. The system comprises a first database engine maintaining a first database, a second database engine maintaining a second database and a replication module. The method comprises: (i) executing, by the first engine, a plurality of write transactions, thereby respectively changing a first instance of a database table in the first database; (ii) asynchronously pooling, by the replication module, the changes of the first instance introduced by the write transactions; (iii) in response to receiving a query against the table, determining whether to execute the received query a) against the first instance of the table or b) against the second instance of the table. In case b) is determined, the method comprises: (iv) identifying, by the first engine, a first time, the first time being the commit time of the one of the write transactions having committed in the first database most recently before the receipt of the query; (v) defining, by the first engine, a current replication batch that selectively comprises the pooled changes of the ones of the transactions having committed at or before the identified first time; (vi) asynchronously replicating, by the replication module, the current replication batch, thereby propagating the changes of the first instance of the table specified in the current replication batch to the second instance of the table; (vii) storing, by the second engine, each change that is specified in the current replication batch in the second instance of the table (viii) assigning, by the first engine, a batch-ID of the current replication batch to the received query; (ix) sending, by the first engine, the query and the assigned batch-ID to the second engine; (x) determining, by the second engine, if the replication of the current replication batch was completed; (xi) after the replication of the current replication batch was completed, executing, by the second engine, the sent query on the second instance of the table, thereby using the batch-ID assigned to the query as a filter to exclude any changes having assigned a batch-ID of a replication batch having committed later than the current replication batch; and (xii) returning, by the second engine, results of the query execution on the second instance of the table.

In a further aspect, the invention relates to a computer program product for processing a query against a table in a data processing system, the computer program product comprising a computer readable storage medium having program instructions embodied therewith, the program instructions executable by a processor to cause the processor to execute the method according to anyone of the embodiments and examples described herein.

In a further aspect, the invention relates to a data processing system comprising: (i) a first database engine maintaining a first database; (ii) a second database engine maintaining a second database; and a replication module.

The first engine is configured for executing a plurality of write transactions, thereby respectively changing a first instance of a database table in the first database. The replication module is configured for asynchronously pooling the changes of the first instance of the table introduced by the write transactions. The data processing system is configured for, in response to receiving a query against the table, determining whether to execute the received query a) against the first instance of the table or b) against the second instance of the table.

The first engine is configured for performing, in case b) is determined, a method comprising: (i) identifying a first time, the first time being the commit of the one of the write transactions having committed in the first database most recently before the receipt of the query; (ii) defining a current replication batch that selectively comprises the pooled changes of the ones of the transactions having committed at or before the identified first time; and (iii) assigning a batch-ID of the current replication batch to the received query. The replication module is configured for asynchronously replicating the current replication batch, thereby propagating the changes of the first instance of the table specified in the current replication batch to the second instance of the table. The second engine is configured for performing, in case b) is determined, a method comprising: (i) storing each change that is specified in the current replication batch in the second instance of the table; (ii) determining if the replication of the current replication batch was completed; (iii) after the replication of the current replication batch was completed, executing the sent query on the second instance of the table, thereby using the batch-ID assigned to the query as a filter to exclude any changes having assigned a batch-ID of a replication batch having committed later than the current replication batch; and (iv) returning results of the query execution on the second instance of the table.

Embodiments of the invention may have several advantages.

According to one beneficial aspect, embodiments of the invention may allow executing a query by the second engine on data contained in the second database that is ensured to have exactly the same state as the data contained in the first database at the moment of receiving the query by the DBMS. This may be advantageous as the query will return exactly the same result when executed by the second engine as would be returned if the query would be executed by the first engine. Thus, embodiments of the invention may provide for a hybrid DBMS in which a query can be executed by the first engine or be dynamically dispatched to the second engine without influencing the content of the result set: the result set will represent the state of the data in the first database at the moment of receiving the query even if the query is dispatched for execution to the second engine and even if there is a significant latency time for replicating data in the first database to the second database.

In a further beneficial aspect, the query may be executed by the second engine on data that has exactly the state of the data in the first database at the moment of receiving the query: this means that the query executed by the second engine does not "see" any changes imposed by other, subsequent write transaction executed by the first engine later than the receipt of the query that is dispatched for execution by the second engine. Some batch replication systems which are based on pooling transaction batches until a predefined criterion is reached (e.g., until a predefined time has lapsed or until a predefined number of write transactions have been pooled for replicating their changes to the second database) replicate a plurality of transactions and respective changes to the second database where they are committed in a batch-wise manner. Thus, thousands of transactions and their changes are replicated at once. If such a replication system is used for replicating data in a hybrid DBMS, a dispatched query executed by the second engine will either see "outdated" data that does not comprise the latest changes made in the first database before the moment of receiving the request, or the second engine may see "too recent" data as data is replicated in large batches and the batch comprising the latest modifications before the receipt of the query may in addition comprise hundreds or thousands of transactions and corresponding changes having been performed by the first engine after the receipt of the query that was dispatched. To the contrary, by using the determined time as a trigger for defining the end of a replication batch and by using the batch-ID as a filter to ignore data records having a later batch-ID, embodiments of the invention may allow using (efficient) batch-wise replication without the disadvantage of losing data consistency, i.e., executing the dispatched query by the second engine on an older or younger state than the exact state of the data in the first database at the moment of receiving the query.

In a further beneficial aspect, a hybrid DBMS is provided that allows consistent query execution on the first and the second database (i.e., in both cases the engine executing the query "sees" the same data) without causing computational overhead for ensuring data consistency. For example, one traditional approach used in federated databases managing two copies of a database to ensure data consistency is to have all write transactions make their modifications to both copies of the database or individual tables directly. These write transactions and the changes they impose are typically synchronized between the databases using the two-phase commit protocol ("2PC protocol"). However, the 2PC protocol is computationally highly demanding and thus not tolerable in many use case scenarios where quick response times are required.

As mentioned above, the other (less computational demanding) approach of using asynchronous replication of large batches capturing changes in the data of the first database over a predefined duration or number of transactions may have the disadvantage that data is not replicated on a per-transaction basis. Thus, the data in the second database may be younger than the data in the first database at the moment when the hybrid DBMS dispatches the received query for to the second engine. Thus, when the second engine executes the dispatched query on one or more table instances stored in the second database, said table instances may comprise changes having been introduced in the corresponding tables in the first database after the moment of receiving the query by the hybrid DBMS. As the units of replicating data changes are batches of transactions of a predefined size (or corresponding to a predefined pooling duration), not individual transactions, the computational overhead of replication is lower than the computational overhead caused by the 2PC protocol. A disadvantage is that the data in the second ("target") database can get stale while the transactions are pooled in batches which results in a significant latency time of data replication which disqualifies this approach for applications that require access to the most recent data. If a query scheduled for execution by the second engine would not wait for the batch to replicate.

Thus, query executing according to embodiments of the invention may have the advantage that consistent query execution is ensured without generating the computational overhead of the 2PC protocol and similar. In addition, long latency times related pooling transactions for replication until a batch of a minimum size is reached may be avoided. Moreover, embodiments of the invention ensure that the second engine to which the query was dispatched "sees" exactly the same data as was contained in the first database at the moment of receiving the query.

Thus, embodiments of the invention may allow ensuring that the hybrid DBMS executes any received query on the first and second database via the first and second engine in a consistent state. This means that the query will return exactly the same results irrespective of whether the hybrid DBMS dynamically decided to execute the query by the first or in the second engine. In any case, as the second engine delays query execution until the current replication batch was completed and as the current batch is created in response to the receiving of the request, the received query "sees" exactly the latest committed state of the data with respect to the time when the query has been received by the hybrid system without the necessity to implement a computational demanding data consistency protocol being based on the replication of individual transaction.

For example, the first engine can be an Online Transaction Processing ("OLTP") engine, i.e., a database engine configured for efficiently processing transactional workloads (OLTP) comprising very large numbers of small, parallel transactions (in particular write transactions), each of them typically accessing only small amounts of data. A second engine can be a database engine configured for efficiently processing analytical workloads (OLAP), which typically comprise only a small number of transactions (read transactions) which, however, are complex, computation-intensive ("analytical") as they process large amounts of data. The OLTP engine can be viewed as the source of the data, as the transactional workloads originally create, update, and delete the data. In some example systems, data in the second database managed by the second engine, e.g., the OLAP engine, is never modified by analytical workloads. However, the changes done in the transactional copy must be replicated in the analytical copy.

According to some examples, the received query is a read query. For example, the hybrid DBMS may be configured to execute all write queries by the first engine on instances of the tables stored in the first database and may be configured for dynamically deciding whether to execute a received read query by the first engine or dispatch it for execution by the second engine. The first engine and the data structure of the tables in the first database may be speed-optimized for performing write queries and the second engine and the data structure of the tables in the second database may be speed-optimized for performing read queries. Thus, by dispatching read queries for execution in the second DBMS, the overall execution time of read and write queries may be reduced as the write questions to be executed by the first engine are not delayed by a first engine busy with executing read requests.

According to examples, the asynchronous replication of the current replication batch comprises removing the transactions specified in the current replication batch from the pooled transactions. This may ensure that each data change to the first database is not replicated twice.

According to some examples, the plurality of write transactions comprises one or more first write transactions and one or more second write transactions. The one or more first write transactions access and change the first instance of the table (i.e., the table that will be accessed by the received (read) query). The one or more second write transactions access and change further table instances stored in the first database which are not accessed by the first engine executing the received query (the further table instances thus represent tables not to be accessed by the later received read query).

The asynchronous pooling of the changes comprises pooling the changes introduced by the one or more first write transactions to the first instance of the table and comprises pooling the changes introduced by the one or more second write transactions in the second table instances. Thus, the pooling of changes is performed database-wide.

According to one implementation variant (table-specific batching), the first time is identified as the commit time of the one of the first write transactions having committed in the first database most recently before the receipt of the query, whereby the commit time of the second write transactions are ignored. The current replication batch is generated such that it selectively comprises the pooled changes of the ones of the first write transactions having committed at or before the identified first time. Thus, a received query that is determined to be dispatched to the second engine will trigger the creation of a batch that solely comprises not-yet replicated but committed transactions which have modified the table that will be accessed by the received query. In case the received query is configured to read data from multiple tables, all committed, non-replicated transactions having changed one of said tables to be accessed by the received query are batched. This implementation variant may be particularly beneficial because the size of the batches can be reduced (id does not comprise changes affecting tables which are not of relevance for the currently received query). Moreover, the replication time and thus the delay is reduced as the dispatched query does not have to wait for the completion of the replication of all the other changes affecting tables which will not be accessed by the dispatched query.

According to an alternative implementation variant, the first time is identified as the commit time of the one of the first and second write transactions having committed in the first database most recently before the receipt of the query, whereby the commit time of the first and second write transactions are evaluated for identifying the most recently committed write transaction. In this implementation variant, the current replication batch is generated such that it comprises the pooled changes of the ones of both the first and/or second write transactions having committed at or before the identified first time.

The asynchronous replication of the current replication batch comprises propagating the changes of the first instance of the table specified in the current replication batch to the second instance of the table and propagating the changes of the further table instances in the first database having been introduced by one of the second write transactions to respective table instances in the second database. The storing comprises storing the changes that are specified in the current replication batch in the second instance of the table (i.e., a table that will be accessed by the received and dispatched query) and in table instances in the second database that correspond to the one or more further table instances in the first database having been changed by one of the second write transactions (i.e., tables that will not be accessed by the received and dispatched query).

According to some further examples, the identified first time is a time measured by a clock operatively coupled to the first engine upon a commit event of said transaction. For example, the clock can be a clock of the operating system of an IT-environment hosting the hybrid DBMS. Likewise, the clock could be an internal clock logic of the DBMS.

According to an alternative example, the identified first time is a time a transaction-ID generated by the first engine upon a commit event of said transaction.

According to an alternative example, the identified first time is a Multiversion Concurrency Control (MVCC) version number generated by a first DBMS comprising the first engine.

According to a still alternative example, the identified first time is a log-record-ID generated by the first engine upon logging a commit event of said transaction. For example, the log-record-ID can be an Algorithm for Recovery and Isolation Exploiting Semantics ("ARIES") or File System-based Write Ahead Log ("FS-based WAL") record ID.

By using existing functionalities for determining a log-ID or a logical timestamp of a database record as a "current time", the implementation of embodiments of the invention may be facilitated.

According to some examples, in response to receiving the query against the table and determining that the query should be executed by the first engine against the first instance of the table, the first engine associates the identified first time with the current replication batch. The current replication batch is replicated together with its associated first time to the second engine. The second engine is configured for: (i) monitoring all replication batches that are replicated to the second database and the times when the replication of each of said replication batches is completed; and (ii) identifying a second time, the second time being the time of completing the replication of the current replication batch; for example, the replication of a batch is completed when all changes specified in the current replication batch are applied to the second database.

Moreover, the second engine is configured for, in response to identifying the second time: (i) storing the second time as the batch-ID of the current replication batch in association with each change that is specified in the current replication batch in the second instance of the table; and (ii) sending the second time in association with the first time to the first engine.

The first engine receives the second time in association with the first time from the second engine. The receipt of the second time indicates that the replication of the current replication batch was completed. In response to receiving the second time, the first engine performs the assignment of the batch-ID to the query. The assignment comprises assigning, by the first engine, the second time as the batch-ID of the current replication batch to the received query.

Identifying and exchanging the first time and the second time between the first and second engine as described above may be advantageous as the first and second engines may use different temporal reference systems for determining a chronological series of "logical time stamps" uses as the "time". By exchanging the first and second times, by sending the request together with a batch-ID to the second engine and by associating the batch-ID as the second time to the current batch, the second engine is enabled to determine if transactions having assigned the batch-ID have been replicated to and stored in the second database and to identify individual data rows within table instances in the second database having assigned the transaction ID.

According to some examples, the determination that the replication of the current replication batch was completed comprises determining that the second time was received by the first engine from the second engine.

According to other examples, the second engine is adapted to access a mapping. The mapping may be used instead of exchanging first and second times for enabling the second engine to identify the data records and data changes having been replicated as elements of the current batch, for enabling the hybrid DBMS to determine that the current replication batch was successfully replicated and to identify the data records of the tables in the second database having been updated upon replicating the current batch in the second database. The first engine is configured for, in response to receiving the query against the first instance of the table, performing the assignment of the batch-ID to the received query. The identified first time is used as the batch-ID of the current replication batch. The replication of the current replication batch comprises providing the current replication batch and its associated first time to the second engine.

The second engine is configured for: (i) monitoring all replication batches that are replicated to the second database and the times when the replication of each of said replication batches is completed; (ii) identifying a second time, the second time being the time of completing the replication of the current replication batch; (iii) in response to identifying the second time, storing the second time of the current replication batch in association with each change that is specified in the current replication batch in the second instance of the table; (iv) in response to identifying the second time, storing the second time in association with the batch-ID (here: the first time which is used as the batch-ID) in the mapping; the mapping comprises a plurality of batch-IDs and respectively assigned second times, said second times being indicative of the time when the replication of the respective replication batch (i.e., the batch whose replication resulted in the generation or update of said data record) has completed.

In this example, the use of the batch-ID as a filter to exclude any changes having assigned a batch-ID of a replication batch having committed later than the current replication batch comprises accessing the mapping for identifying all batch-IDs of replication batches whose associated second times indicate that said replication batch has committed later than the second time associated in the mapping with the batch-ID of the current replication batch; and ignoring all data records in the second instance of the table having assigned one of the identified batch-ID s.

According to examples, the second engine is configured to determine if the replication of the current replication batch was completed. The determination comprises accessing the mapping for determining if the mapping comprises an association of the batch-ID of the current replication batch with the second time. The second engine may access the mapping to check if the mapping does or does not comprise an association of a second-time with a first time acting as the batch-ID. If the mapping does not contain an association of a second time with a batch-ID of the current replication batch (corresponding to the first time representing the commit time of the transaction having committed most recently in the first database before receiving the request by the hybrid DBMS), the second engine determines that the current batch has not yet been replicated. If the mapping comprises said association, the second engine determines that the current batch has been replicated.

According to some examples, the identified second time is a time measured by a clock operatively coupled to the second engine upon committing all changes specified in the current replication batch. For example, said clock can be the clock of an operating system of the computer system hosting the hybrid DBMS or can be an internal clock logic of the hybrid DBSM. Alternatively, the second time can be a transaction-ID generated by the second engine upon committing all changes specified in the current replication batch. Still alternatively, the second time can be a Multiversion Concurrency Control ("MVCC") version number generated by a second DBMS comprising the second engine.

The second time can likewise be a log-record-ID generated by the second engine upon logging an event of committing all changes specified in the current replication batch, e.g., an ARIES or FS-based WAL log record ID.

According to examples, the replication module pools further changes of the first instance(s) of the one or more tables to be accessed by the received query which have been introduced by one or more further write transactions. The first engine receives a further query against the first instance of the table. The further received query is one of one or more further write queries which are performed by the first engine after the (read) query was received and optionally dispatched for execution to the second engine. In response to the receiving of the further query, the first engine identifies a further first time. The further first time is the commit time (e.g., time stamp or snapshot ID) of the one of the write transactions and further write transactions having committed in the first database most recently before the receipt of the further query. The first engine defines a further replication batch that selectively comprises the pooled changes of the ones of the transactions having committed at or before the identified further first time and after the first time. The hybrid DBMS determines whether to execute the received further query against the first instance of the table or against the second instance of the table. For example, the further replication batch is defined in response to receiving a further read query for which the hybrid DBMS has determined that said further read query should be sent to the second engine for execution. The replication module asynchronously (asynchronous to the query processing by the first engine) replicates the further replication batch, thereby propagating the changes of the first instance of the table specified in the further replication batch to the second instance of the table. The second engine stores each change that is specified in the further replication batch in the second instance of the table. The first engine assigns a further batch-ID of the further replication batch to the further query. In response to determining to execute the further query against the second instance of the table, the first engine sends the further query and the assigned further batch-ID to the second engine. The second engine determines if the replication of the further replication batch was completed. After the replication of the further replication batch was completed, the second engine executes the sent further query on the second instance of the table. Thereby, the second engine uses the batch-ID assigned to the further query as a filter to exclude any changes having assigned a batch-ID of a replication batch having committed later than the further replication batch. For example, the second engine evaluates if a data record of a table instance that is accessed by the second engine comprises the batch-ID of the further batch and selectively processes data records comprising or being stored in association with said batch-ID. Then, the second engine returns further results of the execution of the further query on the second instance of the table.

Said features may be advantageous as the size of the replication batches depends on the number of received queries that shall be executed by the second engine, e.g., on the number of analytical read queries. In addition, the replication may be triggered by the number of pooled write transactions (or their respective changes) exceeding a predefined number or the time of pooling transactional changes exceeds a duration threshold. Thus, it may be prohibited that the individual batches become too large.

According to some examples, the second engine executing the received query and the further received query in parallel. The execution of the further query against the second instance of the table comprises using the batch-ID of the current replication batch for filtering out any changes having been propagated to the second instance of the table via the further replication batch.

According to some examples, the pooling of the changes of the first instance of the one or more tables which were imposed by the write transactions comprises: analyzing a log generated by the first engine upon executing the write transactions; extracting database write statements specified in said log and belonging to said write transactions; and pooling the extracted write statements in a queue.

This may be advantageous as the log may already comprise not only the data changes but also logical time stamps e.g., in the form of log record IDs or the like.

According to some examples, the replication of the current replication batch comprises: (i) evaluating, by the replication module, write statements in the current replication batch for identifying multiple write statements configured to modify the same row of the table; (ii) processing, by the replication module, the identified multiple write statements for computing a net effect change that would result if all the identified multiple write statements would be applied on the row; (iii) instead of storing a respective row for each of the identified multiple write statements in the second instance of the table, solely storing a single new row with the computed net effect change in the second instance of the table. The row may be stored in association with the batch-ID.

The computation of the "net effect" of multiple transactional changes and storing (merely) the computed net effects may be advantageous as multiple write operations to one or more tables of the second database can be avoided. As intermediate values can be stored and overwritten faster in the main memory than in the non-volatile storage, the replication may be accelerated by computing the net effect of all transactions specified in a replication batch and storing only the computed net effects in the form of additional or updated data records in tables of the second database.

According to embodiments, the identified multiple write statements comprise statements of at least two different ones of the write transactions executed by the first engine.

Typically, the higher the number of transactional changes specified in a replication batch, the higher the performance gain obtained by the net-effect computation as the intermediate stages are not stored in a non-volatile storage medium of the target system.

According to some examples, the first engine is a database engine of a first DBMS managing the first database. The second engine is a database engine of a second DBMS managing the second database. The first DBMS and the first database are stored on one or more first data processing machines. The second DBMS and the second database are stored on one or more second data processing machines. The one or more first data processing machines are connected to the one or more second data processing machines via a network. The replication module replicates changes of one or more first instances of respective database tables stored in the first database to respective second instances of said tables stored in the second database in multiple replication batches.

According to embodiments, the method is used for executing the received query by the second engine on the second instance of the database table. The second instance has the same data content as the first instance of the table at the moment of receiving the query.

According to some examples, the second engine automatically identifies all table rows in the second table instance having assigned a batch-ID that is older than the batch-IDs used as filter by any query that is currently executed by the second engine and for which a newer row version with a younger batch-ID exists in the second table instance. The second engine marks any one of said identified table rows as deletion candidate. Then, the second engine automatically and asynchronously to the query execution by the second engine, physically deletes the marked table rows from the second database. For example, the physical delete operation can be implemented as part of the MVCC functionality of the target DBMS. Performing an asynchronous deletion may be advantageous as the physical deletion may be performed e.g., at moment of low computational load, thereby preventing a negative impact on the performance of query execution by the second engine. The database table instance managed by the second engine may comprise multiple versions of a data record, each version having assigned a batch-ID of the batch whose replication created said data record in a table instance of the second database.

Thus, multiple data record versions may exist in the tables of the second database and the second engine may thus be able to perform multiple queries having been received by the hybrid DBMS at different time points on different versions of the data. A data version may be marked as "deletable" once the last query having assigned a batch-ID corresponding to said data version has committed in the second database.

According to examples, the pooling of the changes of the first instance of the table comprises: (i) grouping the changes imposed by individual statements of the write transactions such that statements imposing changes on the same table are grouped together; (ii) for each of the tables for which a first instance exists in the first database, checking if the received query is configured to access said table; (iii) selectively in case said table will be accessed by the received query, including changes imposed by committed transactions on said table in the current replication batch; and (iv) in case said table will not be accessed by the received query, continuing pooling the changes imposed by committed transactions on said table without including said changes in the current replication batch.

Said features may be beneficial as larger batches may be replicated by table-wise batching. If a request for a read statement that operates on tables A and B but not on Table C is received, the receipt of said query may act as a trigger for defining the borders of a current batch that selectively comprises all changes imposed by (not yet replicated) write transactions having been performed by the first engine on instances of tables A and B. However, changes imposed by the first engine on an instance of table C are continuously pooled also after the receipt of the query and are integrated in another batch in response to the hybrid DBMS receiving a query that accesses table C and that is determined to be dispatched to the second engine. Thus, the second engine receiving the query that addresses table A and B does not have to wait until also the changes committed in the first database before the receipt of the request were replicated. It is sufficient to wait until the batch comprising changes to tables A and B was successfully replicated.

According to some examples, in case a) is determined, the first engine executes the query. The replication module defines a current replication batch irrespective of the moment of receiving the request. For example, the current replication batch may be created upon the data changes imposed by a predefined maximum number of write statement was pooled or upon a predefined pooling time lapsed. Thus, the query dependent generation of "mini batches" may solely be executed for queries for which the hybrid DBMS decides that they shod be executed on the second database.

According to embodiments, the first engine is configured to execute any requested transaction in accordance with a first MVCC system that may also provide a current MVCC version ID used as the first time in response to receiving the request. In addition, or alternatively, the second engine is configured to execute the sent query and any transaction in the second database in accordance with a second MVCC system that may operate independently of the first MVCC system.

Figure 1:
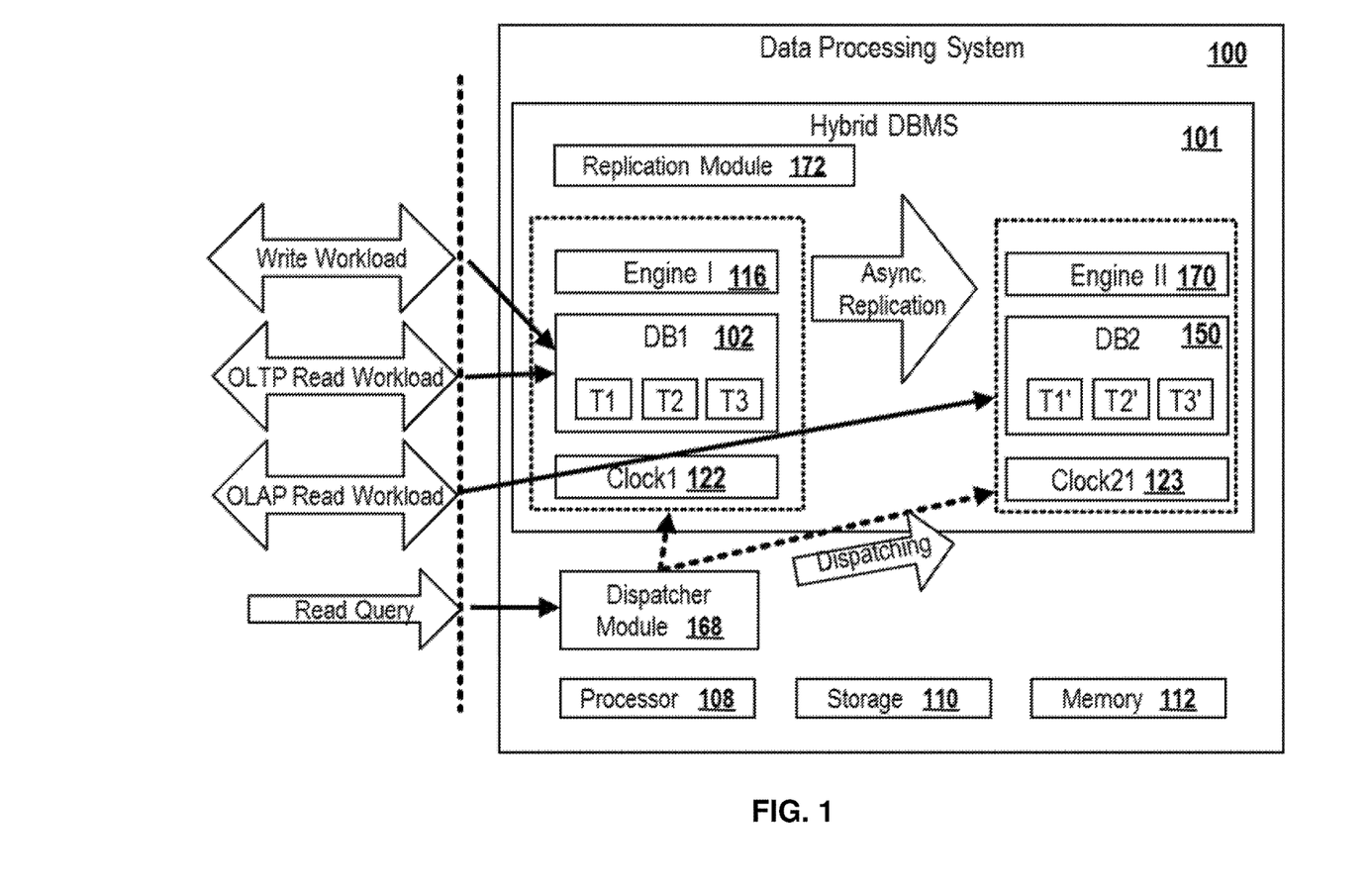
FIG. 1 is a block diagram illustrating a hybrid DBMS, in accordance with at least one embodiment of the present invention.
Figure 2:
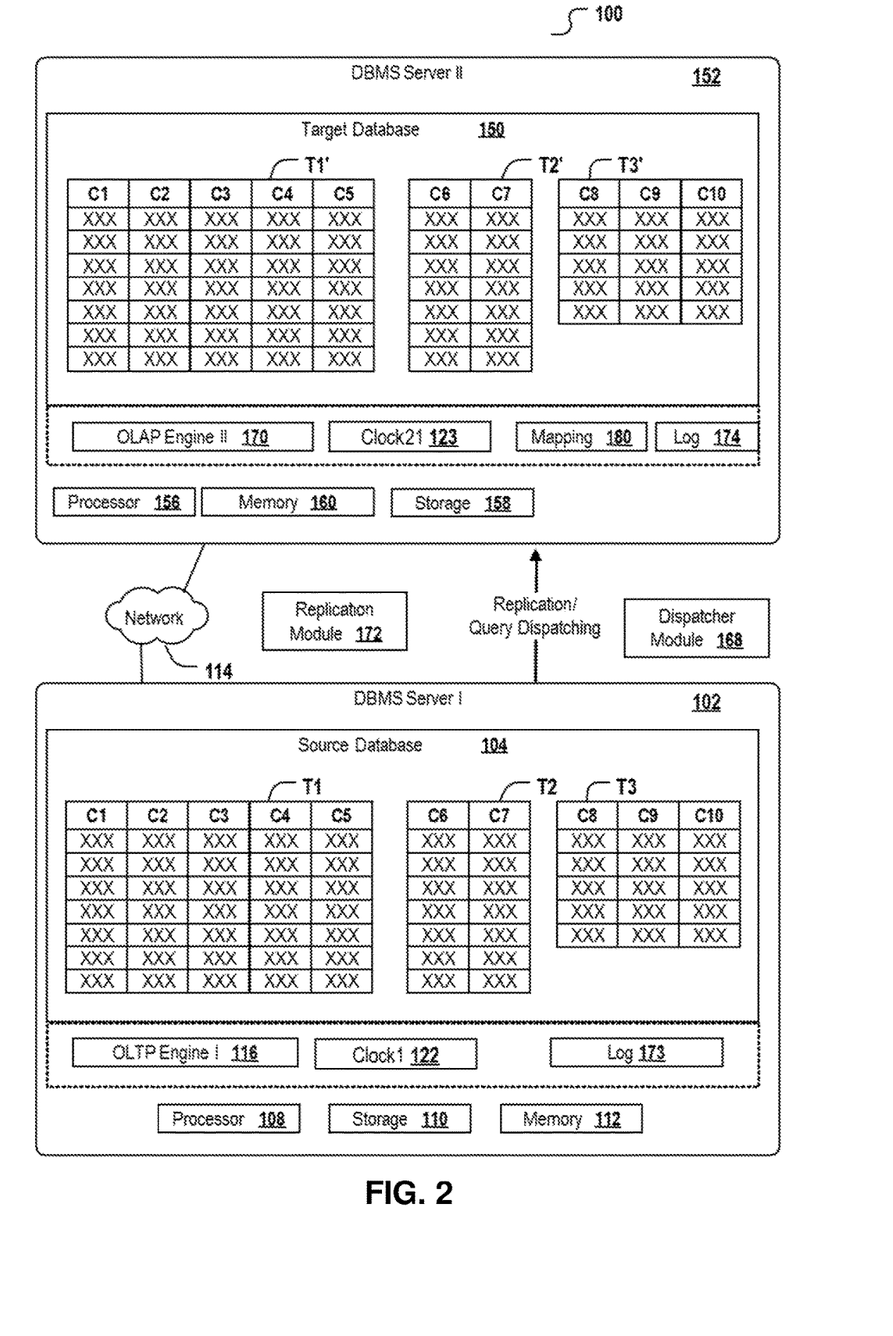
FIG. 2 is a block diagram illustrating another hybrid DBMS, in accordance with at least one embodiment of the present invention.
Figure 3:
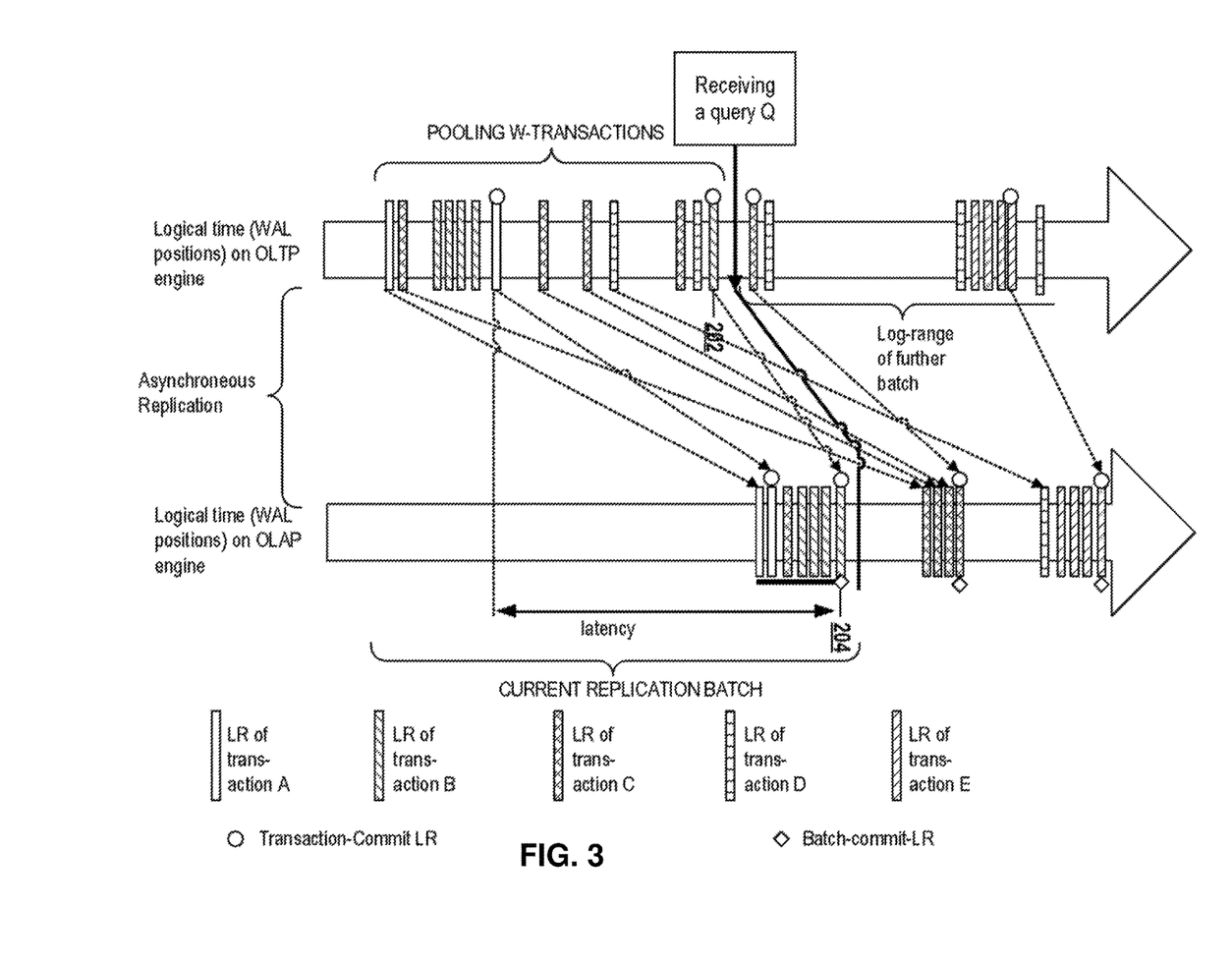
FIG. 3 is a diagram illustrating a replication batch in response to the receipt of a query by a DBMS, in accordance with at least one embodiment of the present invention.
Figure 4:
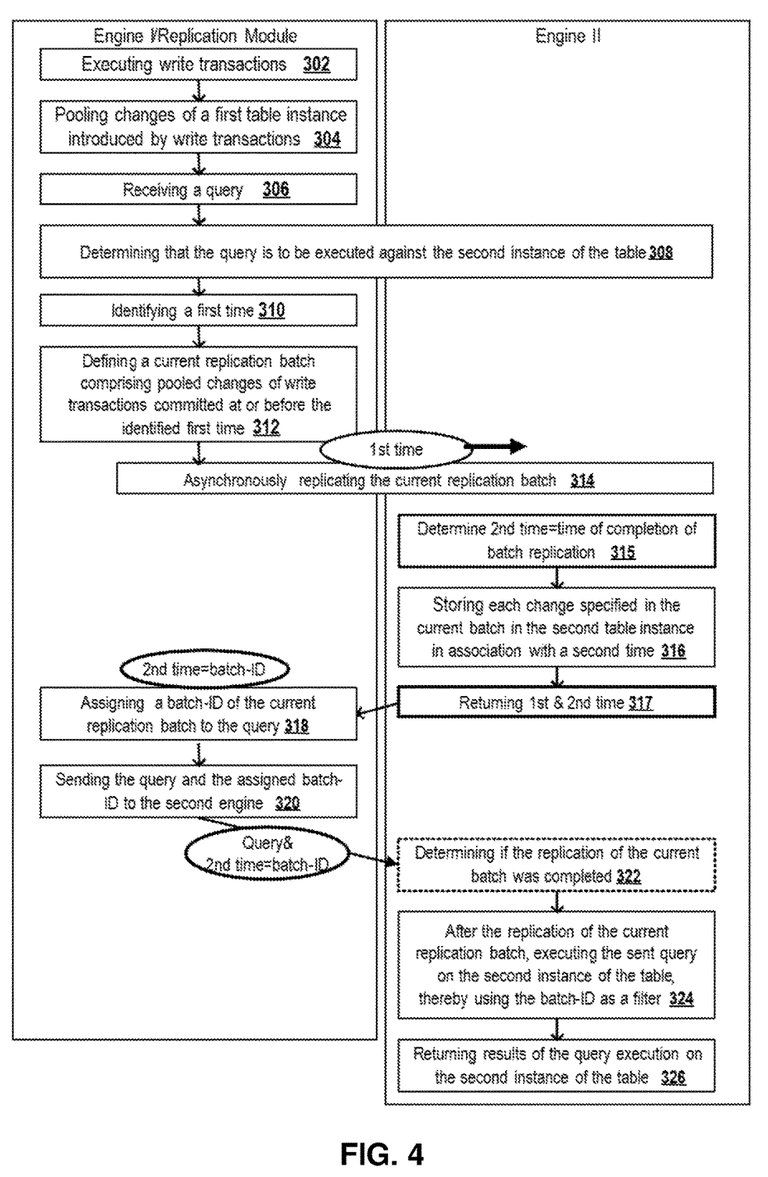
FIG. 4 is flowchart diagram depicting a method of executing a query by the second engine such that the second engine returns a result set that is consistent with the state of the data in the first database at the moment of receiving the query, in accordance with at least one embodiment of the present invention.
Figure 5:
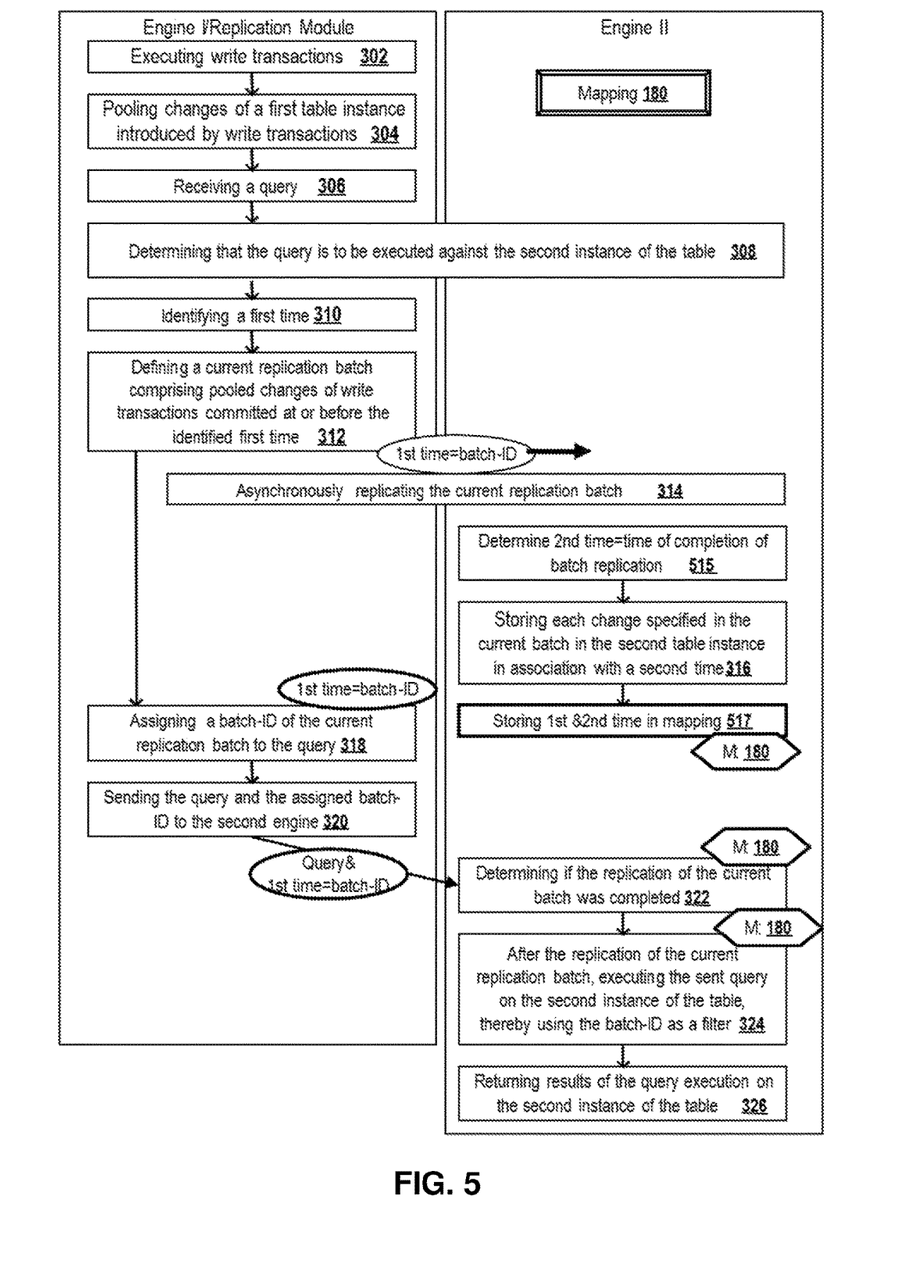
FIG. 5 is a flowchart diagram depicting another method of executing a query by the second engine such that the second engine returns a result set that is consistent with the state of the data in the first database at the moment of receiving the query, in accordance with at least one embodiment of the present invention.
Figure 6:
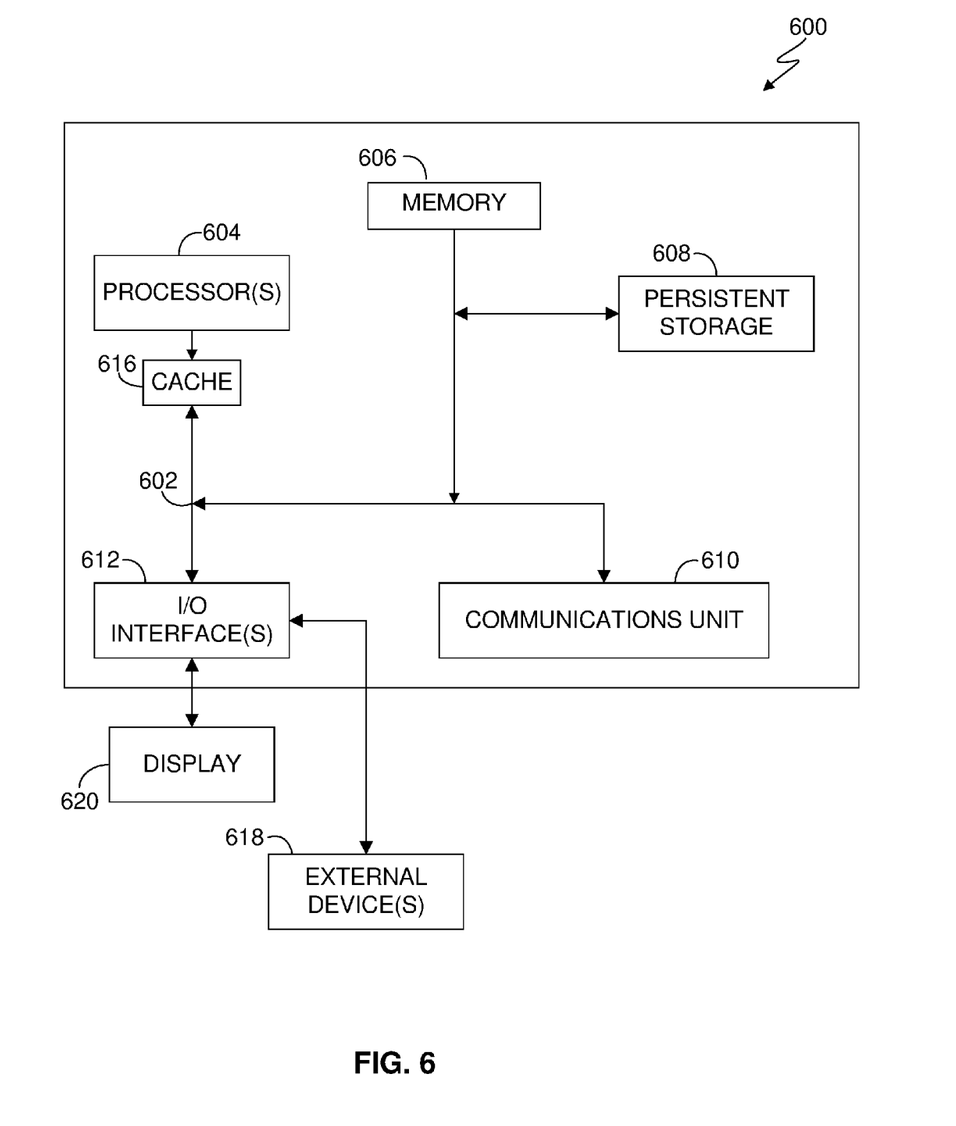
FIG. 6 is a block diagram depicting various logical elements for a computer system capable of executing program instructions, in accordance with at least one embodiment of the present invention.

FIG. 6 is a block diagram depicting components of a computer 600 suitable for executing a program according to the invention. FIG. 6 displays the computer 600, the one or more processor(s) 604 (including one or more computer processors), the communications fabric 602, the memory 606, the RAM, the cache 616, the persistent storage 608, the communications unit 610, the I/O interfaces 612, the display 620, and the external devices 618. It should be appreciated that FIG. 6 provides only an illustration of one embodiment and does not imply any limitations with regard to the environments in which different embodiments may be implemented. Many modifications to the depicted environment may be made.

As depicted, the computer 600 operates over a communications fabric 602, which provides communications between the cache 616, the computer processor(s) 604, the memory 606, the persistent storage 608, the communications unit 610, and the input/output (I/O) interface(s) 612. The communications fabric 602 may be implemented with any architecture suitable for passing data and/or control information between the processors 604 (e.g., microprocessors, communications processors, and network processors, etc.), the memory 606, the external devices 618, and any other hardware components within a system. For example, the communications fabric 602 may be implemented with one or more buses or a crossbar switch.

The memory 606 and persistent storage 608 are computer readable storage media. In the depicted embodiment, the memory 606 includes a random access memory (RAM). In general, the memory 606 may include any suitable volatile or non-volatile implementations of one or more computer readable storage media. The cache 616 is a fast memory that enhances the performance of computer processor(s) 604 by holding recently accessed data, and data near accessed data, from memory 606.

Program instructions for the program according to the invention may be stored in the persistent storage 608 or in memory 606, or more generally, any computer readable storage media, for execution by one or more of the respective computer processors 604 via the cache 616. The persistent storage 608 may include a magnetic hard disk drive. Alternatively, or in addition to a magnetic hard disk drive, the persistent storage 608 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of the persistent storage 608.

The communications unit 610, in these examples, provides for communications with other data processing systems or devices. In these examples, the communications unit 610 may include one or more network interface cards. The communications unit 610 may provide communications through the use of either or both physical and wireless communications links. The program according to the invention may be downloaded to the persistent storage 608 through the communications unit 610. In the context of some embodiments of the present invention, the source of the various input data may be physically remote to the computer 600 such that the input data may be received and the output similarly transmitted via the communications unit 610.

The I/O interface(s) 612 allows for input and output of data with other devices that may operate in conjunction with the computer 600. For example, the I/O interface 612 may provide a connection to the external devices 618, which may include a keyboard, keypad, a touch screen, and/or some other suitable input devices. External devices 618 may also include portable computer readable storage media, for example, thumb drives, portable optical or magnetic disks, and memory cards. Software and data used to practice embodiments of the present invention may be stored on such portable computer readable storage media and may be loaded onto the persistent storage 608 via the I/O interface(s) 612. The I/O interface(s) 612 may similarly connect to a display 620. The display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising, in a data processing system including a first database engine maintaining a first database, a second database engine maintaining a second database, a table existing as a first instance in the first database and as a second instance in the second database, and a replication module:
   executing, by the first engine, a plurality of write transactions, thereby respectively changing the first instance; asynchronously pooling, by the replication module, the changes of the first instance introduced by the write transactions;
   in response to receiving a query against the table, determining whether to execute the query against the first instance or against the second instance; and
   responsive to determining to execute the query against the second instance:
      identifying, by the first engine, a first time, the first time being the commit time of the most recent of the write transactions before the receipt of the query,
      defining, by the first engine, a current replication batch that selectively comprises the pooled changes of the ones of the transactions having committed at or before the first time,
      asynchronously replicating, by the replication module, the current replication batch, thereby propagating the changes of the first instance specified in the current replication batch to the second instance,
      storing, by the second engine, each change that is specified in the current replication batch in the second instance,
      assigning, by the first engine, a batch-ID of the current replication batch to the query,
      sending, by the first engine, the query and the assigned batch-ID to the second engine,
      determining, by the second engine, if the replication of the current replication batch was completed,
      responsive to the current replication batch having been completed, executing, by the second engine, the query on the second instance, thereby using the batch-ID assigned to the query as a filter to exclude any changes having assigned a batch-ID of a replication batch having committed later than the current replication batch, and
      returning, by the second engine, results of the query execution on the second instance.

2. The computer-implemented method of claim 1, wherein:
   the plurality of write transactions comprises one or more first write transactions accessing and changing the first instance of the table and one or more second write transactions accessing and changing further table instances stored in the first database which are not accessed by the first engine executing the query;
   the asynchronous pooling of the changes comprises pooling the changes introduced by the one or more first write transactions to the first instance and comprising pooling the changes introduced by the one or more second write transactions in the further table instances; and
   the first time is identified as the commit time of the most recent of the first write transactions before the receipt of the query, whereby the commit time of the second write transactions is ignored, the current replication batch being generated so as to selectively comprise the pooled changes of the ones of the first write transactions having committed at or before the first time.

3. The computer-implemented method of claim 1, wherein:
   the plurality of write transactions comprises one or more first write transactions accessing and changing the first instance of the table and one or more second write transactions accessing and changing further table instances stored in the first database which are not accessed by the first engine executing the query;
   the asynchronous pooling of the changes comprises pooling the changes introduced by the one or more first write transactions to the first instance and pooling the changes introduced by the one or more second write transactions in the further table instances;
   the first time is identified as the commit time of the most recent of the first and second write transactions in the first database before the receipt of the query, whereby the commit time of the first and second write transactions are evaluated for identifying the most recently committed write transaction, the current replication batch being generated so as to comprise the pooled changes of those of the first and/or second write transactions having committed at or before the first time;

the asynchronous replication of the current replication batch comprises propagating the changes of the first instance to the second instance and propagating the changes of the further table instances in the first database having been introduced by one of the second write transactions to respective table instances in the second database; and the storing comprises storing those changes that are specified in the current replication batch in the second instance and in table instances in the second database that correspond to the one or more further table instances in the first database having been changed by one of the second write transactions.

4. The computer-implemented method of claim 1, wherein the first time is selected from the group consisting of:
a time measured by a clock operatively coupled to the first engine upon a commit event of the transaction;
a transaction-ID generated by the first engine upon a commit event of the transaction;
a multiversion concurrency control version number generated by a first database management system comprising the first engine; and
a log-record-ID generated by the first engine upon logging a commit event of the transaction.

5. The computer-implemented method of claim 1, further comprising:
in response to receiving the query against the table, associating, by the first engine, the first time with the current replication batch, the current replication batch being replicated together with the first time to the second engine;
monitoring, by the second engine, all replication batches that are replicated to the second database and those times when the replication of each of the replication batches is completed;
identifying, by the second engine, a second time, the second time being when the current replication batch is completed; and
in response to identifying the second time:
storing, by the second engine, the second time as the batch-ID of the current replication batch in association with each change that is specified in the current replication batch in the second instance of the table,
sending, by the second engine, the second time in association with the first time to the first engine,
receiving, by the first engine, the second time in association with the first time from the second engine, the receipt of the second time indicating that the replication of the current replication batch was completed, and
the assignment of the batch-ID to the query being performed in response to receiving the second time and comprising assigning, by the first engine, the second time as the batch-ID of the current replication batch to the query.

6. The computer-implemented method of claim 4, wherein the determination that the replication of the current replication batch was completed comprises determining that the second time was received by the first engine from the second engine.

7. The computer-implemented method of claim 1, wherein the second engine is adapted to access a mapping, and further comprising:
in response to receiving the query against the table, performing, by the first engine, the assignment of the batch-ID to the query, the first time being used as the batch-ID of the current replication batch, and the replication of the current replication batch comprising providing the current replication batch and its associated first time to the second engine;
monitoring, by the second engine, all replication batches that are replicated to the second database and the times when the replication of each of the replication batches is completed;
identifying, by the second engine, a second time, the second time being the time of completing the replication of the current replication batch;
in response to identifying the second time;
storing, by the second engine, the second time of the current replication batch in association with each change that is specified in the current replication batch in the second instance of the table;
storing, by the second engine, the second time in association with the batch-ID in the mapping, the mapping comprising a plurality of batch-IDs and respective second times being indicative of the time when the replication of the respective replication batch has completed, wherein the use of the batch-ID as a filter to exclude any changes having assigned a batch-ID of a replication batch having committed later than the current replication batch comprising accessing the mapping for identifying all batch-IDs of replication batches whose associated second times indicate that the replication batch has committed later than the second time associated in the mapping with the batch-ID of the current replication batch; and
ignoring all data records in the second instance of the table having assigned one of the batch-IDs.

8. The computer-implemented method of claim 7, wherein the determining, by the second engine, if the replication of the current replication batch was completed comprises accessing the mapping for determining if the mapping comprises an association of the batch-ID of the current replication batch with the second time.

9. The computer-implemented method of claim 5, wherein the second time is selected from the group consisting of:
a time measured by a clock operatively coupled to the second engine upon committing all changes specified in the current replication batch;
a transaction-ID generated by the second engine upon committing all changes specified in the current replication batch;
a multiversion concurrency control version number generated by a second database management system comprising the second engine; and
a log-record-ID generated by the second engine upon logging an event of committing all changes specified in the current replication batch.

10. The computer-implemented method of claim 1, further comprising:
pooling, by the replication module, further changes of the first instance introduced by further write transactions;

receiving, by the first engine, a further query against the table;

in response to the receiving of the further query:
  identifying, by the first engine, a further first time, the further first time being the commit time of the most recent one of the write transactions and further write transactions before the receipt of the further query,
  defining, by the first engine, a further replication batch that selectively comprises the pooled changes having committed at or before the further first time and after the first time, and
  determining whether to execute the further query against the first instance or against the second instance;

asynchronously replicating, by the replication module, the further replication batch, thereby propagating the changes of the first instance specified in the further replication batch to the second instance;

storing, by the second engine, each change that is specified in the further replication batch in the second instance;

assigning, by the first engine, a further batch-ID of the further replication batch to the further query;

in response to determining to execute the further query against the second instance:
  sending, by the first engine, the further query and the assigned further batch-ID to the second engine,
  determining, by the second engine, if the replication of the further replication batch was completed, and
  after the replication of the further replication batch was completed, executing, by the second engine, the sent further query on the second instance of the table, thereby using the batch-ID assigned to the further query as a filter to exclude any changes having assigned a batch-ID of a replication batch having committed later than the further replication batch; and
  returning, by the second engine, further results of the execution of the further query on the second instance of the table.

11. The computer-implemented method of claim 10, wherein the second engine executes the query and the further query in parallel, the execution of the further query against the second instance comprising using the batch-ID of the current replication batch for filtering out any changes having been propagated to the second instance via the further replication batch.

12. The computer-implemented method of claim 1, wherein the pooling of the changes of the first instance imposed by the write transactions comprises:
  analyzing a log generated by the first engine upon executing the write transactions;
  extracting database write statements specified in the log and belonging to the write transactions; and
  pooling the extracted write statements in a queue.

13. The computer-implemented method of claim 1, wherein the replication of the current replication batch comprises:
  evaluating, by the replication module, write statements in the current replication batch for identifying multiple write statements configured to modify the same row of the table;
  processing, by the replication module, the multiple write statements for computing a net effect change that would result if all the multiple write statements would be applied on the row; and
  instead of storing a respective row for each of the multiple write statements in the second instance, solely storing a single new row with the computed net effect change in the second instance.

14. The computer-implemented method of claim 13, wherein the multiple write statements comprising statements of at least two different ones of the write transactions executed by the first engine.

15. The computer-implemented method of claim 1, wherein:
  the first engine is a database engine of a first database management system managing the first database;
  the second engine is a database engine of a second database management system managing the second database;
  the first database management system and the first database are stored on one or more first data processing machines;
  the second database management system and the second database are stored on one or more second data processing machines; and
  the one or more first data processing machines are connected to the one or more second data processing machines via a network;
and, further comprising:
  replicating, by the replication module, changes of one or more first instances of respective database tables stored in the first database to respective second instances of the one or more database tables stored in the second database in multiple replication batches.

16. The computer-implemented method of claim 1, wherein the second instance has the same data content as the first instance of the table at the moment of receiving the query.

17. The computer-implemented method of claim 1, further comprising:
  automatically identifying, by the second engine, all table rows in the second instance having assigned a batch-ID that is older than the batch-IDs used as filter by any query that is currently executed by the second engine and for which a newer row version with a younger batch-ID exists in the second instance;
  marking, by the second engine, any one of the table rows as deletion candidate; and
  automatically and asynchronously to the query execution by the second engine, physically deleting the marked table rows from the second database.

18. The computer-implemented method of claim 1, wherein the pooling of the changes of the first instance of the table comprises:
  grouping the changes imposed by individual statements of the write transactions such that statements imposing changes on the same table are grouped together;
  for each of the tables for which a first instance exists in the first database, checking if the query is configured to access the table;
  selectively, if the query accesses the table, including changes imposed by committed transactions on the table in the current replication batch; and
  if the query does not access the table, continuing pooling the changes imposed by committed transactions on the table without including the changes in the current replication batch.

* * * * *